Sept. 23, 1958 N. G. NORTON, SR 2,853,109
UPWARDLY SLICING POTATO CUTTER
Filed April 8, 1957 2 Sheets-Sheet 1
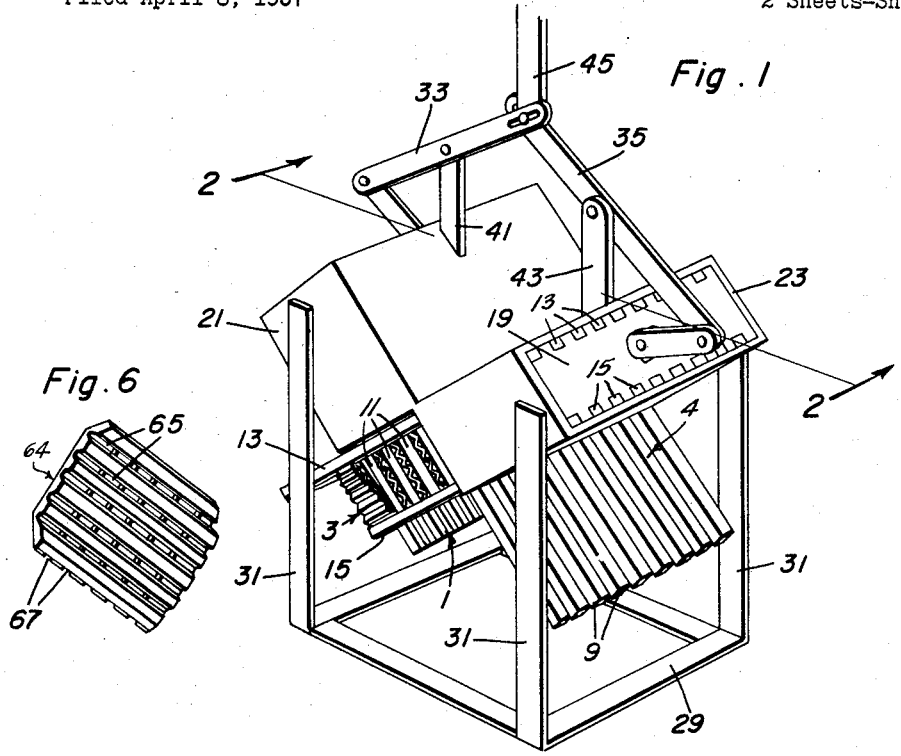
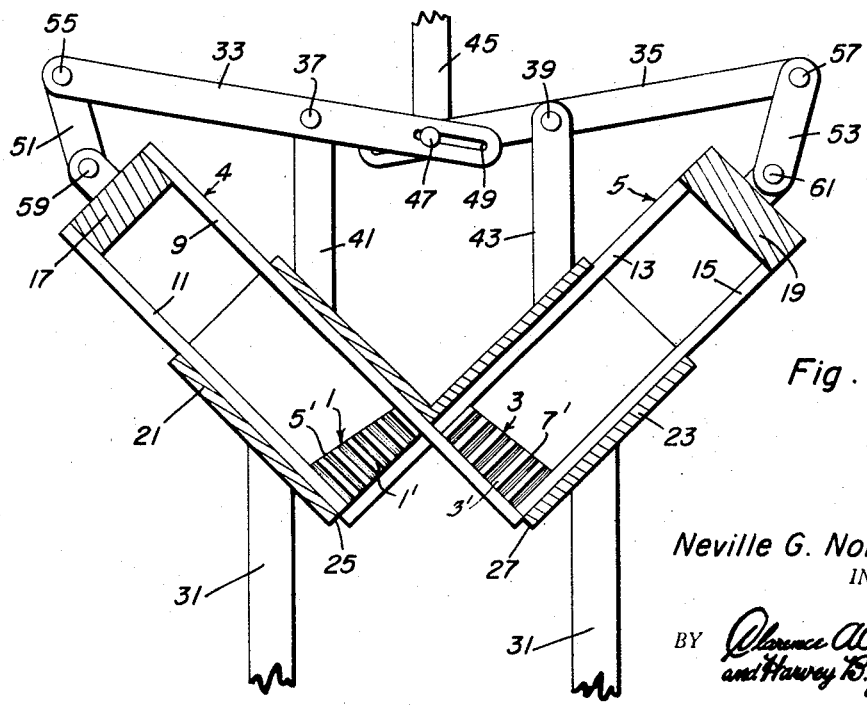
Neville G. Norton, Sr.
INVENTOR.

Sept. 23, 1958  N. G. NORTON, SR  2,853,109
UPWARDLY SLICING POTATO CUTTER
Filed April 8, 1957  2 Sheets-Sheet 2
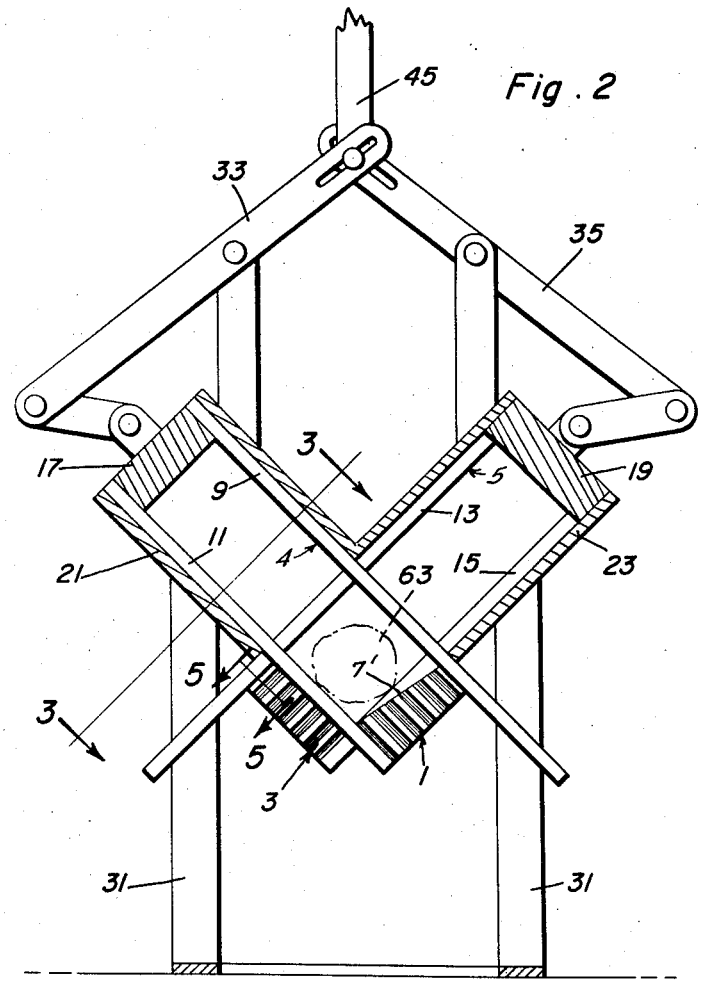
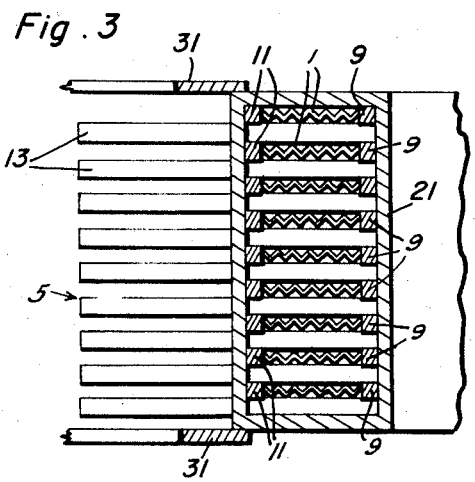
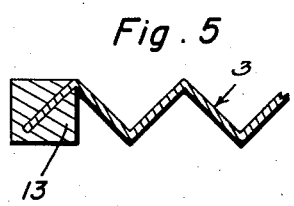
Neville G. Norton, Sr.
INVENTOR.

United States Patent Office 2,853,109
Patented Sept. 23, 1958

2,853,109

UPWARDLY SLICING POTATO CUTTER

Neville G. Norton, Sr., Alice, Tex., assignor to Norton's, Inc., Alice, Tex., a corporation of Texas Application April 8, 1957, Serial No. 651,436

3 Claims. (Cl. 146—78)

My invention relates to potato slicers or cutters and is designed as an improvement over the potato cutter forming the subject matter of my copending application Serial No. 592,838, filed June 21, 1956, now Patent No. 2,790,474, dated April 30, 1957.

The primary object of this invention is to provide a potato cutter for cutting whole potatoes into corrugated waffle slices as in my copending application but which is greatly simplified without sacrificing efficiency, easier to operate and less expensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of my improved potato cutter;

Figure 2 is an enlarged view in vertical section taken on the line 2—2 of Figure 1;

Figure 3 is an enlarged fragmentary view in cross-section taken on the line 3—3 of Figure 2;

Figure 4 is an enlarged fragmentary view in vertical section illustrating the operation of the cutter;

Figure 5 is a fragmentary enlarged view in cross-section taken on the line 5—5 of Figure 2; and Figure 6 is a perspective view of one of the waffle slices.

Referring to the drawings by numerals, my improved potato cutter comprises two series 1, 3 of oblong side by side upright cutter blades alternately spaced in each series with respect to those of the other series in closely spaced vertical planes so that they can alternate from and into interdigitated position relative to each other and which are formed with upper cutting edges designated 5' in series 1 and 7' in series 3.

The series 1, 3 of cutter blades are mounted by means presently described for inclined reciprocation upwardly and downwardly crosswise past each other in right angularly related paths from and into a normal position. The series 1, 3 of cutter blades are corrugated as at 1', 3' parallel with the paths of reciprocation thereof so that each series is corrugated at right angles to the other series. The upper cutting edges 5', 7', of the series 1 and 3 of cutter blades extend transversely of the paths of reciprocation of said series of blades for a purpose presently clear.

The series of blades 1, 3 are fixed to and between pairs of upper and lower parallel plunger bars arranged in two series designated 4 and 5, respectively, with pairs of upper and lower plunger bars 9, 11 in series 4 and pairs of upper and lower plunger bars 13, 15 in series 5. The pairs of upper and lower plunger bars 9, 11 and 13, 15 of the two series 4, 5 extend upwardly from the series of blades 1, 3 in diverging relation with the pairs of upper and lower bars of each series disposed alternately with respect to those in the other series and in right angled, crossed engaging relation. As shown in Figure 5, with reference to one of the blades of the series 3 and one of the upper plunger bars 13, the blades may be mortised into the plunger bars to fix the same thereto.

The series 4, 5 of pairs of upper and lower plunger bars 9, 11, 13, 15 are fixed to a pair of rectangular shaped reciprocable plunger heads 17, 19, respectively, to depend from said heads, and said series 4, 5 of pairs of upper and lower plunger bars 9, 11, 13, 15 are reciprocably fitted in a pair of hollow elongated guides 21, 23 of rectangular cross-section diverging upwardly in right angular relation in V formation with lower open ends 25, 27. As will be seen, the series 4, 5 of pairs of upper and lower plunger bars 9, 11, 13, 15 are reciprocable in the guides 21, 23 upwardly and downwardly in right angularly related paths to correspondingly reciprocate the series 1, 3 of cutter blades. The upper plunger bars 9, 13 of the series of 4, 5 of pairs extend downwardly past the series 1, 3 of cutter blades for a purpose presently explained.

The guides 21, 23 are supported in elevated position in a frame comprising a rectangular shaped base 39 provided with upstanding corner legs 31.

Operating means similar to that of my aforesaid patent is provided for reciprocating the plunger heads 17, 19. This means comprises a pair of levers 33, 35 rocking in vertical planes and mounted on upstanding arms 41, 43 respectively, which arms are mounted on the guides 21, 23 respectively. A hand lever 45 is connected by a stud and slot connection 47, 49 to corresponding ends of the levers 33, 35. The other ends of the levers 33, 35 are operatively connected to the plunger heads 17, 19 respectively, by links 51, 53 respectively. Said links 51, 53 are pivoted to said levers 33, 35 as at 55 and 57 respectively, and to the heads 17, 19 as at 59 and 61 respectively.

The operation of the invention will now be described. In the normal position of the parts, shown in Figures 1 and 3, the lever 55 has been pulled upwardly to rock the levers 33, 35 counterclockwise and clockwise respectively, whereby to move the plunger heads 17, 19 downwardly so that the pairs of upper and lower plunger bars 9, 11 and 13, 15 are thrust downwardly to extend out of the lower ends 25, 27 of the guides 21, 23 and the series 1, 3 of the cutter blades are moved below said ends 25, 27 of the guides 21, 23 with the cutting edges 5', 7' of the series 1, 3 of cutter blades in V formation as shown in Figure 3. In this position of the pairs of upper and lower plunger bars 9, 11 and 13, 15 and of the series 1, 3 of cutter blades, a potato, as shown in broken lines at 63 in Figure 3, may be shoved in between said pairs of upper and lower plunger bars 9, 11, 13, 15 to rest on the cutting edges 5', 7' of the series 1, 3 of cutter blades. Now, by thrusting the hand lever 45 downwardly, the levers 33, 35 may be rocked clockwise and counterclockwise respectively, to cause the plunger heads 17, 19 to be moved upwardly. This moves the pairs of upper and lower plunger bars 9, 11, 13, 15 upwardly in diverging right angularly related paths to correspondingly move the series 1, 3 of cutter blades whereby said series 1, 3 of cutter blades are moved upwardly past each other as shown in Figure 4 into the guides 21, 23 into and from interdigitated crossed, relation so that said series 1, 3 of cutter blades cut upwardly through the potato 63 in right angularly related paths and thereby cut slices therefrom such as the one shown in Figure 6 and designated 64 having corrugated sides, the corrugations 65 on one side being at right angles to the corrugations 67 on the other side, whereby the slices are given a waffle appearance.

As will be obvious, the slices will be discharged downwardly between the pairs of upper and lower plunger bars 9, 11, 13, 15 for collection in a pan, not shown, placed under the guides 21, 23 and when the series 1, 3 of cutter blades are moved or retracted into the lower ends 25, 27 of said guides 21, 23 the upper plunger bars 9, 13 will extend downwardly beyond the series 1, 3 of cutter blades across said ends 25, 27 and prevent cut slices from being pushed into said guides 21, 23 and thereby act as strippers for the slices.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a potato cutter, two series of upright side-by-side cutter blades alternately spaced in each series with respect to those in the other series in closely spaced vertical planes with upper cutting edges, and means for reciprocating said series of said cutter blades crosswise of and past each other upwardly and downwardly in right angularly related paths from and into normal position in which said series of cutter blades are disposed with their upper cutting edges in V formation for laying a potato on said edges to be sliced by upward movement of said series of cutter blades past each other, said means comprising two series of pairs of upper and lower plunger bars having the series of cutter blades fixed between the upper and lower plunger bars of the pairs, the pairs of plunger bars of each series being alternately spaced in each series of pairs relative to the pairs in the other series in crossed right angular relation for reciprocation in right angularly related paths, whereby to correspondingly reciprocate the series of cutter blades, a pair of hollow guides fixedly mounted in V formation with upper and lower open ends and through which the series of pairs of upper and lower plunger bars reciprocate respectively, and manual means for reciprocating said series of pairs of plunger bars in unison.

2. The combination of claim 1, said manual means comprising a pair of plunger heads from which said series of plunger bars depend respectively.

3. The combination of claim 1, the upper plunger bars of the series of pairs extending across the lower ends of the guides to prevent potato cuttings from entering said lower ends of the guides.

No references cited.